United States Patent
Amitai et al.

(10) Patent No.: US 8,098,439 B2
(45) Date of Patent: Jan. 17, 2012

(54) HIGH BRIGHTNESS OPTICAL DEVICE

(75) Inventors: Yaakov Amitai, Rehovot (IL); Jonathan Gelberg, Ra'anana (IL)

(73) Assignee: Lumus Ltd., Rehovot (IL)

( * ) Notice: Subject to any disclaimer, the term of this patent is extended or adjusted under 35 U.S.C. 154(b) by 796 days.

(21) Appl. No.: 11/570,582

(22) PCT Filed: Jun. 16, 2005

(86) PCT No.: PCT/IL2005/000636
§ 371 (c)(1),
(2), (4) Date: Sep. 12, 2008

(87) PCT Pub. No.: WO2005/124427
PCT Pub. Date: Dec. 29, 2005

(65) Prior Publication Data
US 2009/0279180 A1    Nov. 12, 2009

(30) Foreign Application Priority Data
Jun. 17, 2004  (IL) .......................... 162572

(51) Int. Cl.
*G02B 27/14* (2006.01)
*G09G 5/00* (2006.01)
*F21V 7/04* (2006.01)

(52) U.S. Cl. ............................. 359/630; 345/7; 362/624
(58) Field of Classification Search .................. 359/13, 359/599, 630, 633; 345/7, 8, 9; 362/610, 362/615, 624
See application file for complete search history.

(56) References Cited

U.S. PATENT DOCUMENTS
6,509,982 B2   1/2003  Steiner
2003/0165017 A1*  9/2003  Amitai .......................... 359/636

FOREIGN PATENT DOCUMENTS
GB   2 278 888   11/1994
WO   WO 01/95027   12/2001
WO   WO 03/081320   10/2003

* cited by examiner

*Primary Examiner* — Alessandro Amari

(57) ABSTRACT

There is provided an optical device, composed of a display source (4), an imaging optical module (8), a projection module (12) having a projection mechanism including an input aperture (10) and output aperture (14) defined by a surface area, and an exit pupil (16). The projection mechanism is non-uniform over the area of the output aperture (14).

17 Claims, 6 Drawing Sheets

HIGH BRIGHTNESS OPTICAL DEVICE

FIELD OF THE INVENTION

The present invention relates to display systems, and more particularly to see-through display systems.

The invention can be implemented to advantage in a large number of personal imaging applications, such as, head-mounted and head-up displays, hand-held displays, as well as binoculars, monoculars and bioculars. In addition, such systems may serve as image projection systems for front projectors utilizable in conference rooms and as rear projection TV screens.

BACKGROUND OF THE INVENTION

One of the important applications for compact optical elements is in head-mounted displays (HMDs) wherein an optical module serves both as an imaging lens and a combiner, in which a two-dimensional display is imaged to infinity and reflected into the eye of an observer. The image to be displayed is obtained directly from either a spatial light modulator (SLM), such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Usually, one of the most important issues to be addressed while designing an HMD is the brightness of the optical system. This issue is mostly important for see-through applications, where it is desired that the brightness of the display will be comparable to that of the external scene.

The strive for high brightness has led to several different complex optical solutions, all of which, on the one hand, are still not sufficiently bright for many practical applications, and, on the other hand, suffer major drawbacks in terms of fabrication procedures and operational conditions.

DISCLOSURE OF THE INVENTION

The present invention facilitates the design and fabrication of very high brightness display sources for, amongst other applications, head-mounted displays. The invention allows a highly efficient use of the available light of the illumination source, that is to say, a relatively high brightness system, together with relatively low power consumption, can be achieved. The optical system of the present invention is particularly advantageous because it is substantially brighter than state-of-the-art implementations and yet it can be readily incorporated, even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modern combat aircraft, but also in civilian aircraft, in which HUD systems have become a key component for low-visibility landing operation. Furthermore, there have recently been numerous proposals and designs for HUDs in automotive applications where they can potentially assist the driver in driving and navigation duties. Nevertheless, state-of-the-art HUDs suffer several significant drawbacks. All HUD's of the current designs require a display source that must offset the brightness of the external scene, to ensure that the projected data will be readable even with very bright ambient light. As a result, the present HUD systems usually require complicated high brightness display sources which are necessarily bulky, and large, and require a considerable installation space, which makes it inconvenient for installation and at times even unsafe to use.

An important application of the present invention relates to its implementation in a compact HUD, which alleviates the aforementioned drawbacks. In the HUD design of the present invention, the combiner is illuminated with a compact display source having high brightness and small power consumption. Hence, the overall system is very compact and can be readily installed in a variety of configurations for a wide range of applications.

A further application of the present invention is the provision of a compact display with a wide FOV for mobile, hand-held application such as cellular phones. In today's wireless internet-access market, sufficient bandwidth is available for full video transmission. The limiting factor remains the quality of the display within the end-user's device. The mobility requirement restricts the physical size of the displays, and the result is a direct-display with a poor image viewing quality. The present invention enables a physically very compact display with a very large and bright virtual image. This is a key feature in mobile communications, and especially for mobile Internet access, solving one of the main limitations for its practical implementation. Hence, the present invention enables the viewing of the digital content of a full format Internet page within a small, hand-held device, such as a cellular phone.

Furthermore the invention is also suitable for use in the construction of the illumination of front and rear projection devices. Here the design replaces a complex three dichroic polarizing beam splitters with accurate alignment requirements.

For all possible applications, the present invention is particularly advantageous for substrate-mode configuration, that is, for a configuration comprising a light-transmitting substrate having at least two major surfaces and edges; optical means for coupling the light from the imaging module into said substrate by total internal reflection, and at least one partially reflecting surface located in said substrate for coupling the light onto the viewer's eye. The combination of the present invention with a substrate-mode configuration can yield a very compact and convenient optical system along with very high brightness and low power consumption.

The broad object of the present invention is therefore to alleviate the drawbacks of state-of-the-art virtual image display devices and to provide other optical components and systems having improved performance, according to specific requirements.

The invention therefore provides an optical device, comprising a display source; an imaging optical module; a projection module having a projection mechanism including an input aperture and output aperture defined by a surface area, and an exit pupil, characterized in that said projection mechanism is non-uniform over the area of said output aperture.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of an embodiment of a display system in accordance with the present invention;

FIG. 2 is a diagram illustrating the footprint of the light, which is coupled into the system's pupil, on the front surface of the collimating lens, according to the present invention;

FIG. 3 is a side view of a device according to the present invention, utilizing a liquid-crystal display (LCD) light source;

FIG. 4 illustrates an enlarged view of the display source and the first lens of the optical system, according to one embodiment of the present invention;

FIG. 5 illustrates a display system in accordance with the present invention, wherein the imaging system is a telecentric lens;

FIG. 6 illustrates a display system in accordance with the present invention, wherein the light waves are projected onto the exit pupil using an optical combiner;

FIG. 7 illustrates a display system in accordance with the present invention, wherein the light waves are coupled into a light-guide optical element;

FIG. 8 is a diagram illustrating detailed sectional views of a light-guide optical element;

FIG. 9 illustrates the reflectance curves as a function of incident angle for three exemplary dichroic coatings;

FIGS. 10a to 10c illustrate the reflectance curves as a function of incident angle for three other exemplary dichroic coatings, and FIG. 11 is a diagram illustrating a method to expand a beam along two axes utilizing a double LOE configuration.

DETAILED DESCRIPTION OF PREFERRED EMBODIMENTS

Figure 1:
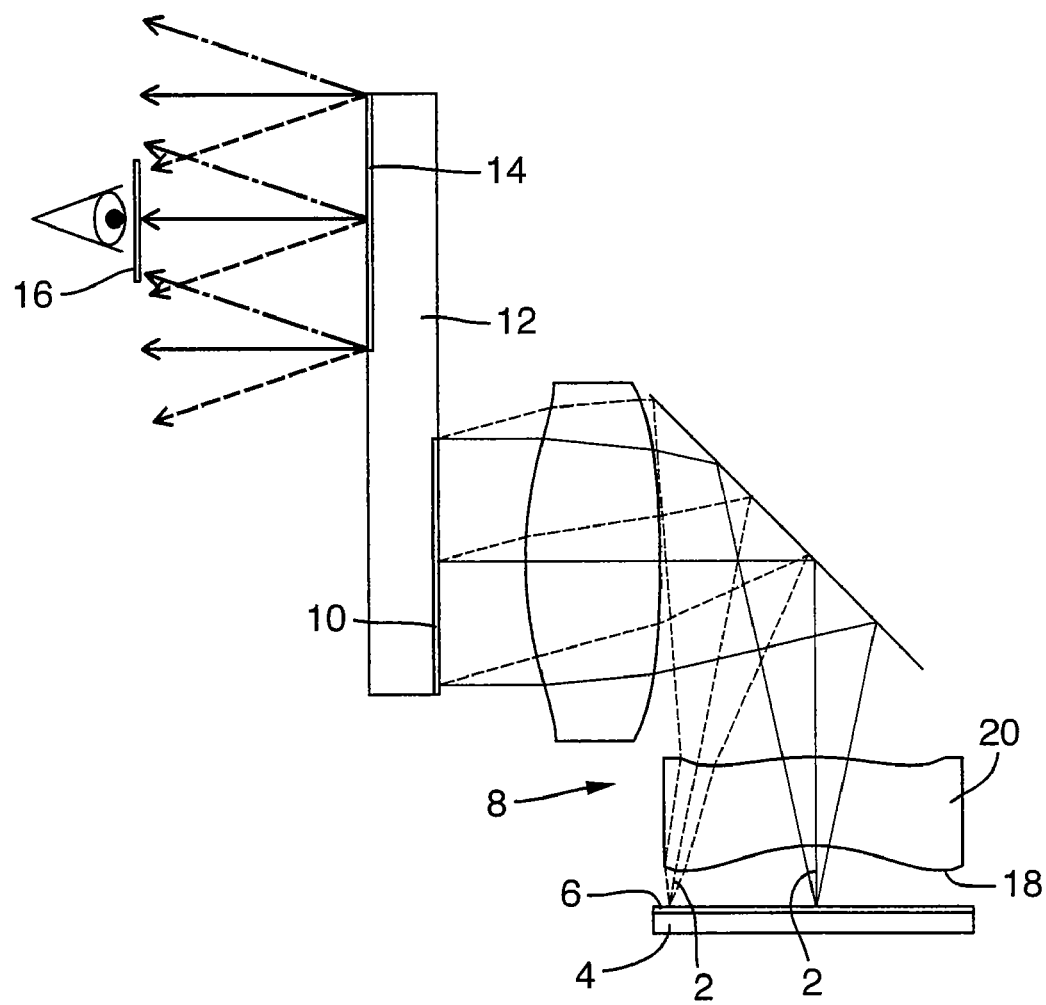

FIG. 1 illustrates a conventional virtual-image display optics arrangement, wherein light waves 2 emerging from a display source 4 are diffused by a light diffusing mechanism 6, that can be an integral part of the display source, such that each light wave which is emerging from a single point of the display source is diverged into a finite solid angle, e.g., a cone. The light waves are then imaged by an imaging module 8 and illuminate the input aperture 10 of a projection module 12. The light waves are directed to a surface area of the output aperture 14 of the projection module and then coupled into the exit pupil 16 of the optical system. For most optical systems this exit pupil 16 can be defined as the head-motion-box (HMB) or the eye-motion-box (EMB) for a biocular or a monocular respectively, that is, the place where the viewer can see the entire image simultaneously. In addition, for see-through optical systems, where the image is projected into the viewer's eye(s) through an optical combiner, the output aperture 14 of the projection system may be defined as the active area of the external surface on the combiner's plane.

One of the major issues to be addressed while designing a display system is the image brightness as seen by the viewer. This issue is particularly important for see-through applications, where it is desired that the brightness of the display will be comparable to that of the external scene, to allow acceptable contrast ratio and convenient observation through the combiner.

For most of the optical systems it is not possible to ensure that the insertion loss of the system is small. For example, there are systems where the transmittance of the external view should exceed $\eta$ (where $\eta<1$) and any color change of the original external scene is not allowed. Therefore the image brightness decreases through the combiner by a factor of $1/(1-\eta)$. In principle, high-brightness display sources can offset this difficulty, and indeed there are display sources such as CRTs and virtual retinal displays (VRDs) that can yield very high brightness. Nevertheless, this approach necessarily has a practical limitation. Not only are high-brightness display sources very expensive, they also have high power consumption with the associated very high electrical currents. Moreover, the size, the volume and the manufacturing costs of the high brightness devices are usually very high. Furthermore, even such high-brightest displays reach an inherent limit in terms of the maximal brightness that can be achieved. As an example, the brightness of a VRD is limited by the maximal output power of the laser source, which is usually less than 100 mW for diode lasers. As for other display sources, for example, transmission LCDs, which are presently the most abundant source for small displays, the back-illumination light power is limited to avoid undesired effects like flaring which decrease the resolution and contrast ratio of the display. Therefore, other approaches are required to optimize the use of the available light from the source.

Consequently, the present invention offers another method to improve the overall brightness of the system by controlling the display source brightness without changing the input power. As shown in FIG. 1, to maximize the achievable brightness, three independent conditions must be fulfilled simultaneously: a) most of the light that emerges from the display source should be coupled into the input aperture of the projection system; b) most of the light from the input aperture should be coupled into the output aperture of the projection system, and c) most of the light from output aperture of the projection system should be coupled into the exit pupil of the optical system.

Figure 2:
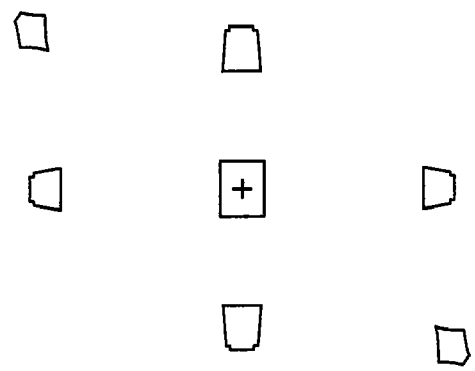

While FIG. 1 illustrates an optical layout of an imaging system, FIG. 2 illustrates the footprint of the light, which is coupled into the output aperture 10, on the front surface 18 of the lens 20. Typically, most display sources exhibit a near-Lambertian distribution of the emitted light. That is, the light power is essentially distributed uniformly over the entire angular spectrum of $2\pi$ steradians. As can be seen in FIGS. 1 and 2, however, only a small portion of the angular illumination distribution of the display source is actually coupled into the output aperture 10. From each point source on the display surface, only a small cone of light of ~20-30° illuminates the footprint on the front surface 18, and is therefore coupled into the input aperture 10. Consequently, a significant increase in the brightness can be achieved if the light which emerges from the display is concentrated inside this cone.

Figure 3:
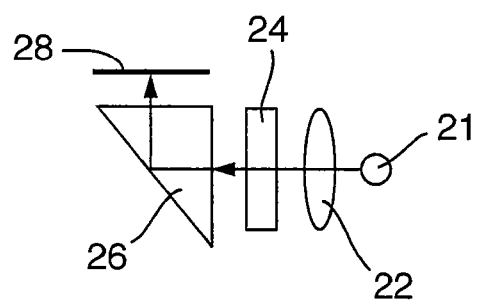

One method to achieve directionality in the source illumination is to use a special angular selective diffuser for the LCD. FIG. 3 illustrates an example of a display system where the display source is a transmission LCD. The light, which emerges from the light source 21 and is collimated by lens 22, illuminates an LCD 24. The image from the LCD is collimated and reflected by the optical components 26 onto the output aperture 28. Usually, a conventional diffuser scatters the light uniformly in all directions. Alternatively, an angularly selective diffuser can spread the light in such a way that the light from each point source diverges into the required angular cone. In this case, the power that the LCD surface illuminates remains the same. For a 20-30° cone, the diverging angle of the light for each point source is reduced by a factor of more than 50 as compared to the $2\pi$ steradians of a Lambertian source, and therefore the brightness of the light increases by the same factor. Hence, a significant improvement in the brightness of the system can be achieved with a minimal design and manufacturing effort and without increasing the power consumption of the system. A particularly advantageous configuration is to exploit holographic diffusers that can control with a great precision the divergence angle of the scattered light waves and can as well achieve higher optical efficiencies than conventional diffusers. It must be noted here that the spatial coherence of the illuminating light source 21 is usually quite limited, that is, the light source is not a point source but has a finite size. A typical value for a conventional LED is in the order of 1 mm. As a result, the output wave from the collimating lens 22 cannot be a pure plane wave but rather a continuity of plane waves with an angular spread of approximately 10°. Hence, if the required divergence of the spreading cones from the display surface has to be 30°, then the required divergence angle of the selective diffuser should be in the order of 20°.

An alternative solution, which is appropriate not only to LCDs but also to other display sources, is to use an array of micro-lenses that is aligned with the pixels of the display source. For each pixel, a micro-lens narrows the diverging beam that emerges from that pixel into the desired angular cone. In fact, this solution is efficient only if the fill-factor of the pixels is a small number, or when the achievable resolution of the display source is actually greater than the required resolution. An improved version of this solution is to design the emitting distribution function of the pixels in the pixel-array to make each pixel diverge into the required angle. For example, in OLED displays, efforts are usually made to increase the divergence angle of the single LEDs in order to allow viewing from a wide angle. For the present specific display application, however, it is advantageous to keep this divergence angle small, in the order of 20-30°, to optimize the brightness of the system.

Figure 4:
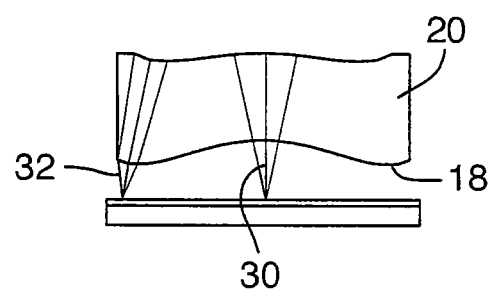

FIG. 4 illustrates an enlarged view of the display source and the first lens of the optical system depicted in FIG. 1. As can be seen, only a small cone of light of ~30° indeed diverges from each point in the display source to illuminate the exit pupil. However, the propagation direction of each cone is actually different. While for the central point 30 of the source the chief ray of the beam is normal to the display plane and cone itself is symmetrical around the normal, the chief ray of the marginal point is inclined at an angle of ~20° to the normal. In this case, there are three methods to ensure that the rays from the entire display source will illuminate the entrance aperture of the projecting module. One method is to utilize a non-uniform light diffusion mechanism, which can be either an angular selective diffuser wherein the diffusion direction depends on the exact location on the diffuser surface, or a micro-lenses array having a period, which is slightly different than that of the display pixel array. Apparently, this method imposes difficulties on the fabrication and the assembly processes of the optical system. An alternative method is to utilize a diffuser having a divergence angle that covers the rays spreading of the entire display source. Although this method is simple to implement it is clear that it reduces the brightness of the system. The required divergence in the example given above is approximately 70°, hence, the output brightness is decreased by a factor of ~5.5.

A totally different approach to solve this difficulty is to utilize a telecentric lens as the imaging module, that is, to use a lens in which the aperture stop is located at the front focus, resulting in the chief rays being parallel to the optical axis in the display space. Usually, the image from a telecentric lens remains in focus over the same depth of field as that of a conventional lens working at the same f-number. Telecentric lenses provide constant magnification at any object distance. Therefore, they make accurate dimensional measurements over a larger range of object distances than a conventional lens. This property is very important for gauging three-dimensional objects, or objects whose distance from the lens is not known precisely.

A further approach to achieve the required illumination on the entrance pupil of the projecting module is applicable mainly for LCD based optical systems. As can be seen in FIG. 3, the light from the source 21 is collimated by the converging lens 22 into a plane wave, or rather into a continuity of plane waves. Instead of collimating the light source, however, it is possible to focus it to a different focal plane. As can be seen in FIG. 4, the chief ray of the marginal point is inclined at an angle of ~20° to the normal. Assuming that the display source has a lateral dimension of 10 mm, the chief rays from the pixels of the display all converge to a virtual point, located approximately 15 mm from the display source. Therefore, by utilizing the lens 22 to converge the light from source 21 to this point, the required light divergence from the display source can be achieved. In this specific case, in order to achieve the desired illumination, the required lens 22 should have a wide aperture and both the light source 21 and the lens 22 should have a very large numerical aperture. However, by changing the design of the lens 22, such that the chief ray of the marginal point would be inclined at an angle of ~10°, instead of 20°, to the normal, it is easily possible to achieve the required light divergence on the display source 24. Hence, in this case a simpler illumination device is constructed with no need for a complicated telecentric lens. In practice, the design of an optical system according to the present invention can compromise between the design and manufacturing efforts and the specified brightness according to the specific requirements of the optical system.

Figure 5:
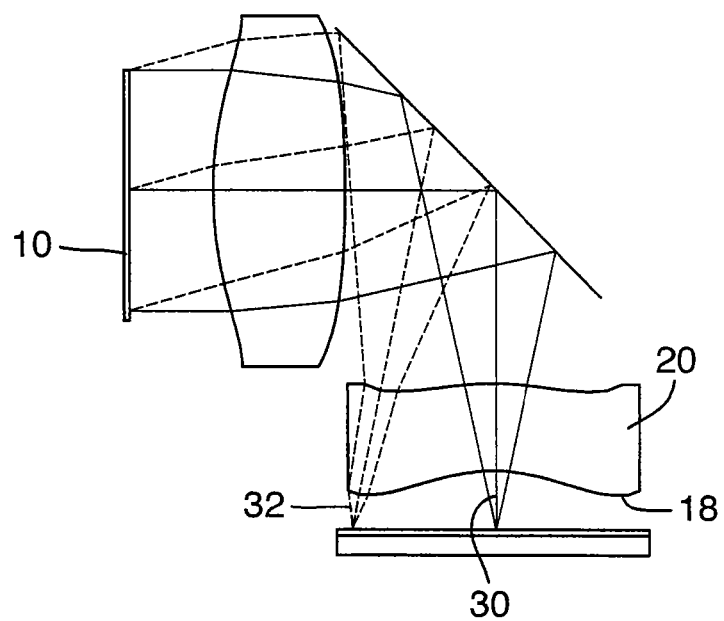

FIG. 5 illustrates a modified display system as compared to the system illustrated in FIG. 1. The main modification is that the surfaces of the image module 8 and especially surface 18 are now designed to achieve a telecentric system, e.g., a telecentric lens. As can be seen, now both the chief ray of the central wave 30, as well as the chief rays originating at the edges of the display 32, are normal to the display plane. Apparently, a uniform divergence angle of ~30° is sufficient to ensure that the waves of the entire display will cover the exit pupil. This can be implemented using a uniform angular selective diffuser or with a conventional micro-lens array so that here the optimal brightness can be reached.

The degree of telecentricity is usually measured by the chief ray angle in the corner of the field. In machine vision, a standard commercial lens may have chief ray angles of 20 degrees or more, wherein telecentric lenses have chief ray angles less than 0.5 degree and some telecentric lenses even have chief ray angles of less than 0.1 degree. The design of a lens having a high degree of telecentricity is typically complex which often also leads to high manufacturing efforts. For the present invention, however, the telecentricity is not required for measurement accuracy and the degree of telecentricity is not critical. Therefore, a simple lens with a telecentricity of a few degrees is sufficient to achieve the required optimal brightness, namely the telecentricity of the imaging optical module is selected to achieve a pre-designed brightness.

Figure 6:
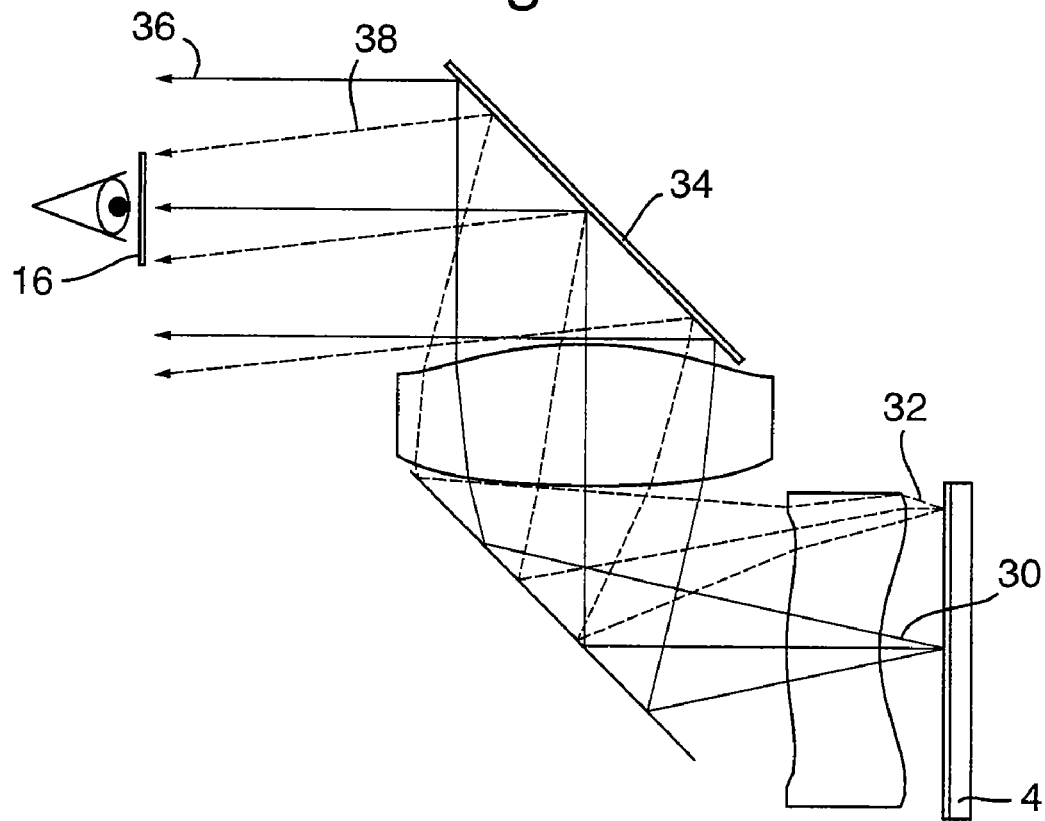

Apparently, the present invention facilitates the design and fabrication of very high brightness display sources for, amongst other applications, optical systems with see-through capabilities where the brightness of the projected image is critical, such as head-mounted displays (HMDs) and head-up displays (HUDs) where the light from the display source reaches a single eye and both eyes of an observer, respectively. FIG. 6 illustrates a schematic diagram of an HMD system. The collimated waves are reflected by the optical combiner 34 into the exit pupil 16 of the system. Here, the optical combiner, which acts as the projection mechanism of the system, can be either a semi-reflective surface for see-through systems or a totally reflective mirror for non see-through systems. Assuming that the light from the display source is indeed collected into the combiner, the brightness of the display source $B_D$ is $$B_D = W_S/(\alpha_D * S_D) * \gamma, \quad (1)$$

wherein $W_S$ is the energy of the light source (in lumens), $\gamma$ is the efficiency coefficient of the display source, the area of the display source is $$S_D = f^2 * \alpha_H, \quad (2)$$

the divergence angle from the display (in steradians) is $$\alpha_D = S_{in}/f, \quad (3)$$

where f is the focal length of the collimating lens, $\alpha_H$ is the FOV of the HMD (in steradians) and $S_{in}$ is the entrance area of the projection module. Inserting Eqs. (2) and (3) into Eq. (1) yields $$B_D = W_S/(\alpha_H * S_{in}) * \gamma. \quad (4)$$

The output brightness at the exit pupil is $$B_H = R * B_D \quad (5)$$

wherein R is the reflectance coefficient of the combiner. Inserting Eq. (4) into Eq. (5) yields $$B_H = R * W_S * /(\alpha_H * S_{in}) * \gamma. \quad (6)$$

As can be seen in FIG. 6, the collimated central wave 36 and marginal wave 38 are not overlapped at the plane of the exit pupil. Hence, the aperture of the exit pupil, where the entire FOV can be seen, is much smaller than the combiner's aperture. As a result, only part of the light which is reflected from the combiner 34 reaches the area of the exit pupil 16, where the viewer's eye can see the projected display.

Figure 7:
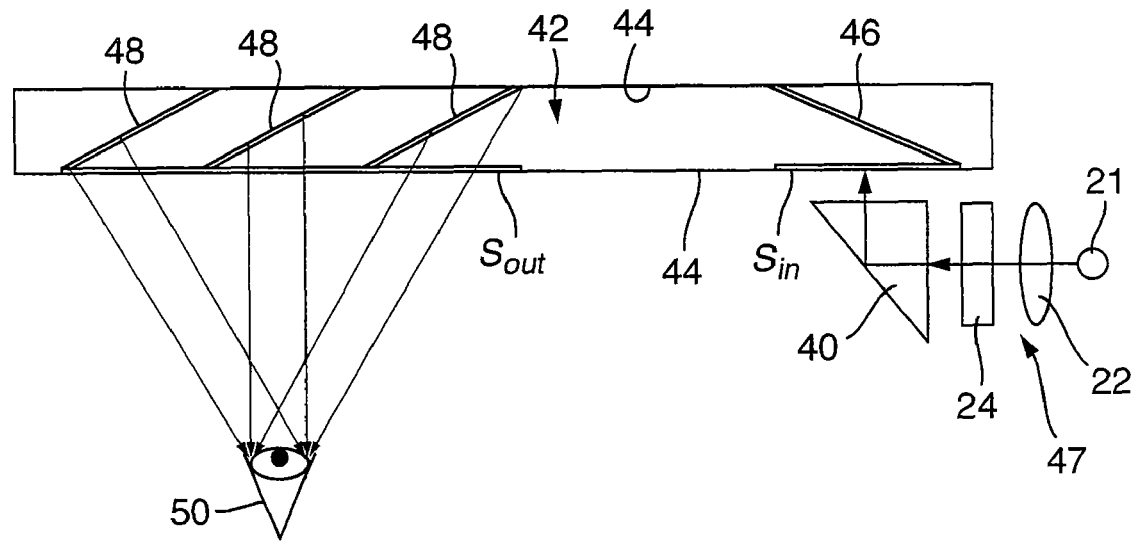

It is possible to increase the photonic efficiency of the optical system significantly, by utilizing light-guided optics configurations. FIG. 7 illustrates an optical system according to the present invention, wherein the projection mechanism is a light-guide optical element (LOE) comprising a light-transmitting substrate 42 having at least two major parallel surfaces 44; optical means 46 for coupling the light from the imaging module 47 into the substrate 42 by total internal reflection, and at least one partially reflecting surface 48 located in the substrate for coupling the light onto the viewer's eye 50. The combination of the present invention with an LOE configuration can yield a very compact and convenient optical system along with very high brightness and low power consumption.

As illustrated in FIG. 7, the entrance area $S_{in}$ of the LOE, which is the projection of surface 46 on the major surface 44 of the LOE, is significantly smaller than the exit area $S_{out}$, which is the projection of surfaces 48 on the major surface 44 of the LOE. Usually, $S_{in} < n * S_{out}$, wherein n is number of partially reflecting surfaces 48. The light which is trapped inside the LOE by total internal reflection is expanded inside the substrate. Hence, assuming a uniform output illumination over the entire output area of the LOE, the brightness of the image output from the LOE is $$B_l = R * B_D * S_{in}/S_{out}. \quad (7)$$

Inserting Eq. (4) into Eq. (7) yields $$B_l = R * W_S * /(\alpha_H * S_{in}) * \gamma * S_{in}/S_{out} = R * W_S * \gamma * /(\alpha_H * S_{out}) \quad (8)$$

Figure 8:
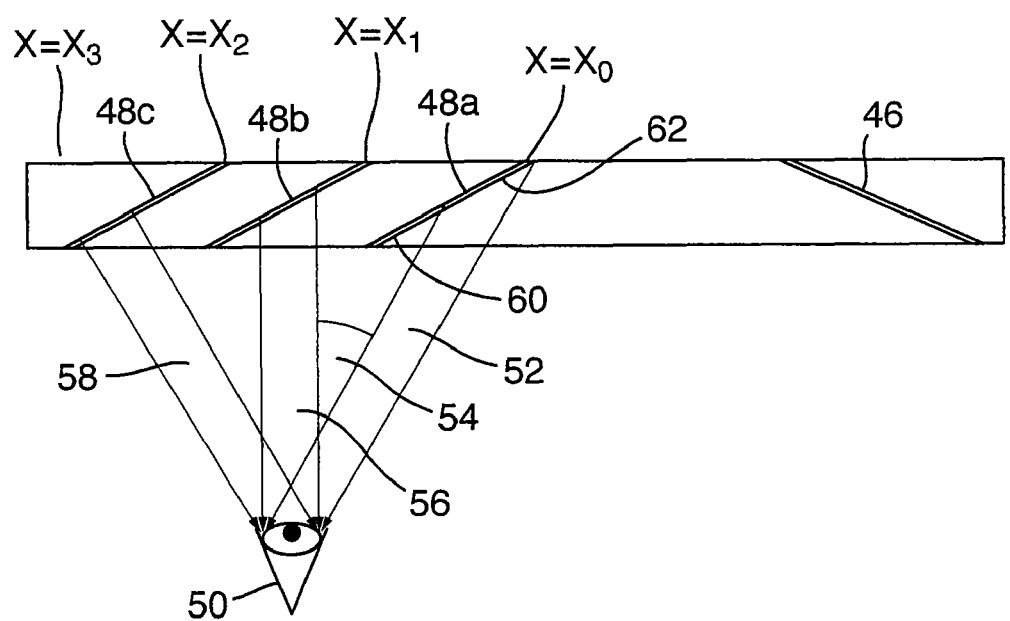

It is possible to significantly improve this value by exploiting the unique structure of the LOE. In considering the viewing angles, different portions of the resulting image emerge from different portions of the partially reflecting surfaces. FIG. 8, which is a sectional view of a compact LOE display system based on the proposed configuration, illustrates this effect. Here, a single plane wave 52, representing a particular viewing angle 54, illuminates only part of the overall array of partially reflecting surfaces 48a to 48c. Thus, for each point on the partially reflecting surface, a nominal viewing angle is defined, and the reflectance is designed according to this angle.

Figure 9:
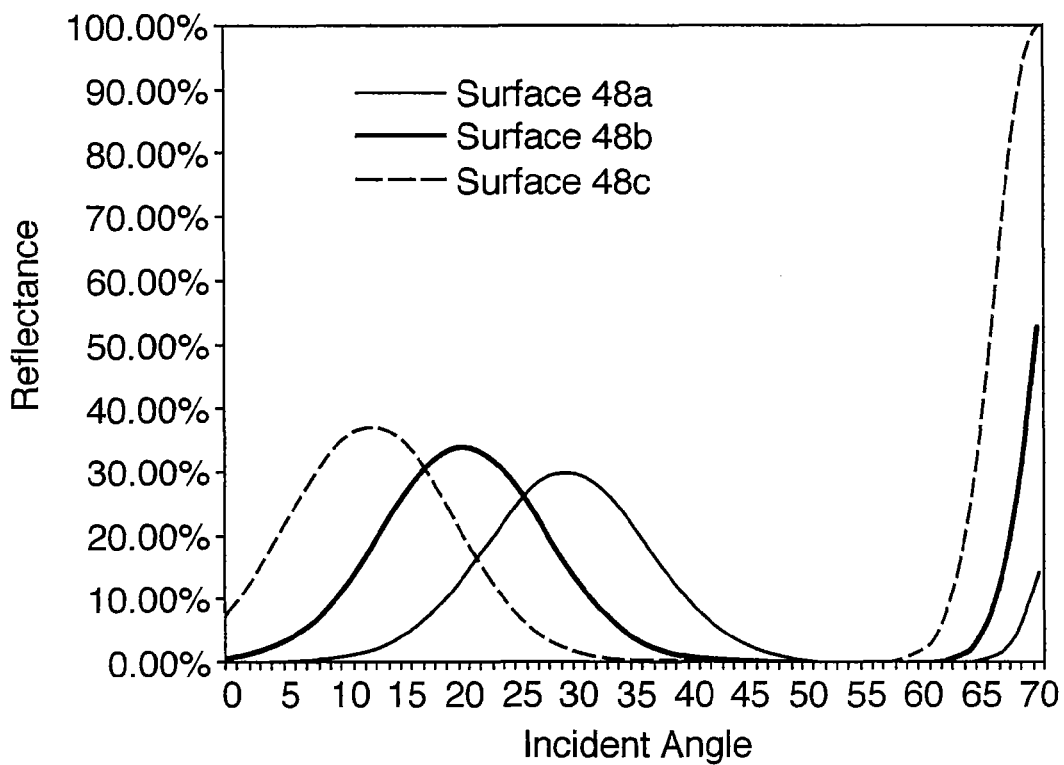

One approach for achieving the required brightness distribution is to design n different coatings for the n partially reflecting surfaces 48. FIG. 9 plots an example of three different coatings which are designed for the optical system illustrated in FIG. 8. It is assumed that the required transmission of the substrate is 65±5% and that the optical rays over the entire FOV impinge at the reflecting surfaces at incident angles of 20°±10°, wherein the waves 52, 56 and 58 (FIG. 8) impinge at the reflecting surfaces at incident angles of 30°, 20° and 10° respectively. As illustrated in FIG. 9, the reflectance at surface 48a is 30%, 12% and 2% at the incident angles of 30°, 20° and 10° respectively. The reflectance at surface 48b is 33% and 12% at incident angles of 20° and 10° respectively and the reflectance at surface 48c is 37% at the incident angle of 10°. Apparently, the overall efficiency of the waves 52, 56 and 58 is approximately 30% while the transmission over the entire active area of the LOE is higher than 60%.

One problem in the proposed approach is that there are discontinuities in the overall reflectance curve of the active area at the boundary points $X_1$ and $X_2$, between the reflecting surfaces 48a and 48b and between the reflecting surfaces 48b and 48c, respectively. Usually, it is difficult to fully compensate for such discontinuities. Nevertheless, in practice, the human eye tolerates significant variations in brightness, which remain unnoticed. For near-to-eye displays, the eye integrates all the light which emerges from a single viewing angle and focuses it onto one point on the retina, and since the response curve of the eye is logarithmic, small variations, if any, in the display's brightness will not be noticeable. Therefore, even for moderate levels of illumination uniformity within the display, a human eye experiences a high-quality image. The required moderate uniformity can readily be achieved with an LOE.

For displays located at a distance from the eye, however, like head-up displays, the non-uniformity due to the multiple intersection effects cannot be tolerated. For these cases, a more systematic method to overcome the non-uniformity is required. In such a case, coating the reflecting surfaces with different coatings, as illustrated in FIG. 8, does not fully compensate for the uneven illumination. A possible solution is to use a non-uniform reflecting coating for each one of the partially reflecting surfaces, to compensate for the non-uniformity and to achieve an image of uniform brightness over the entire FOV. The simplest correction method is to set, for each reflecting surface, the reflectance to increase monotonically along the propagation direction of the trapped rays. This increase can be either continuous or gradual. For instance, as illustrated in FIG. 8, the reflectance at point 60 is higher than at point 62.

The design of the coatings of the various partially reflecting surfaces of the LOE is performed as follows: For each particular angle, a ray is plotted (taking into account the refraction due to Snell's Law) from the center of the designated eye pupil 50 to the partially reflecting surface. The calculated direction is set as the nominal incident direction and the particular coating is designed according to that direction, taking into account prior reflectance related to this particular viewing angle. In addition, the coating in each section of the reflecting surface is set to minimize the influence of this section on the rays that should not be reflected out in this particular section. Hence, for each viewing angle, the average reflectance from the relevant surfaces will be close to the desired reflectance.

Figure 10A:
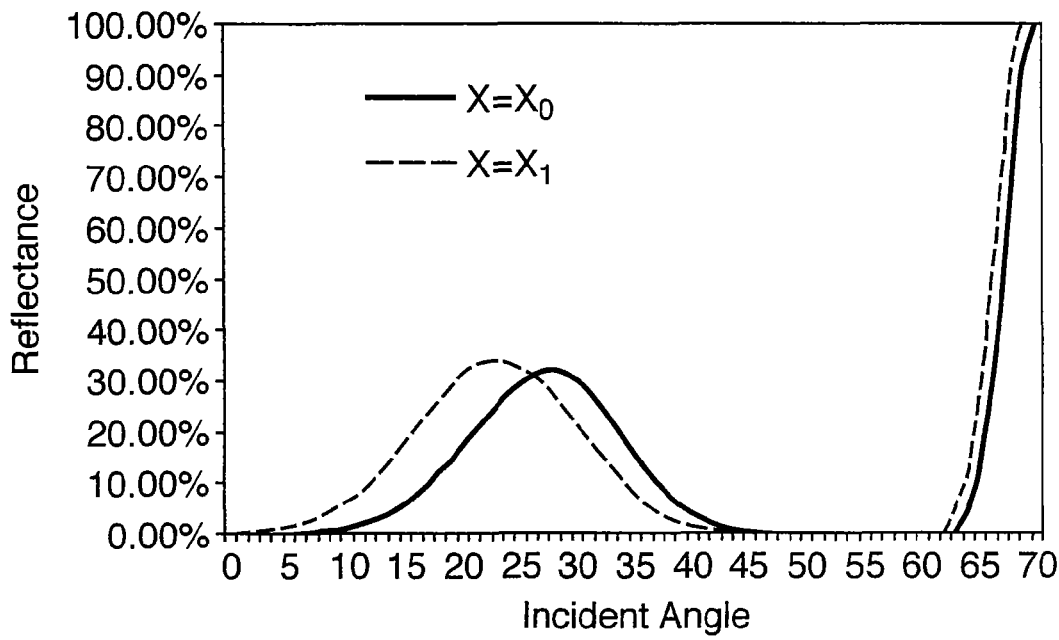
Figure 10B:
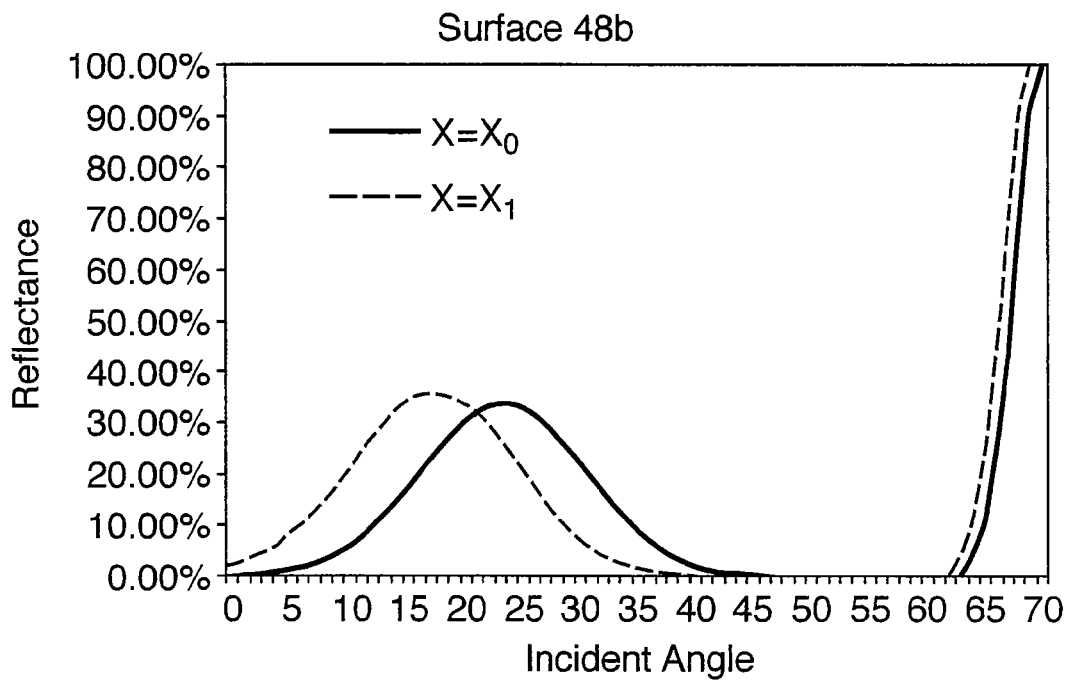
Figure 10C:
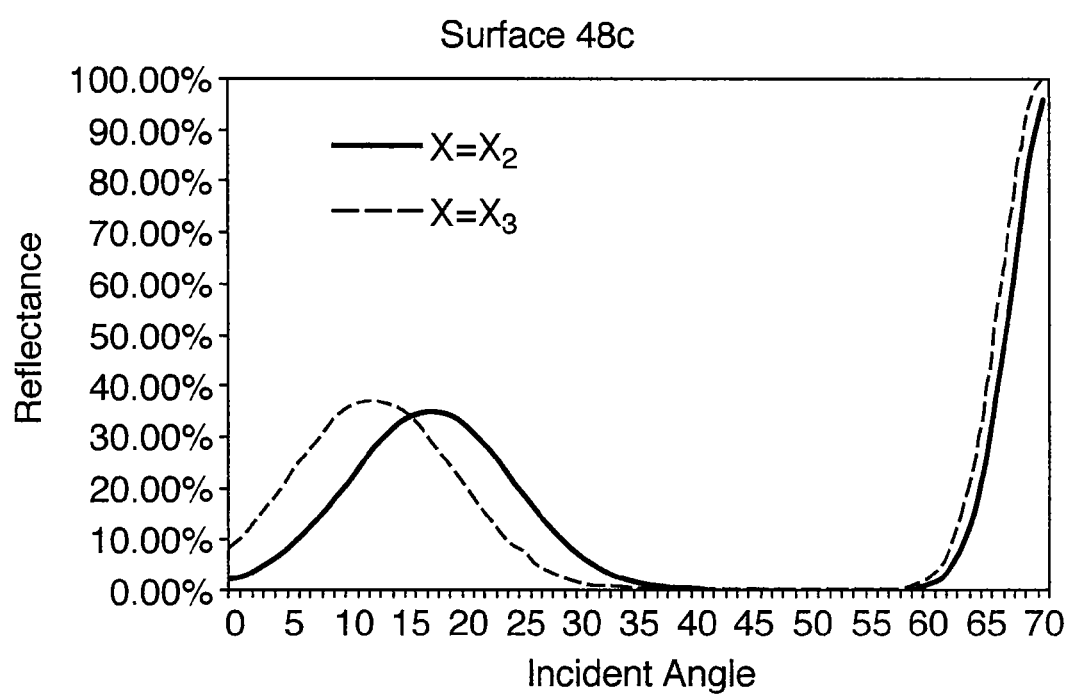

FIGS. 10a, 10b and 10c illustrate two different sections of the three reflecting surfaces 48a, 48b and 48c respectively, each having different reflectance curves. Assuming the same requirements as above, it is desired that the brightness is locally uniform over the entire active area of the LOE. Therefore, as illustrated in FIGS. 10a to 10c, reflectance at point $X_0$ is 30%, 20%, 9% and ~0% at the incident angles 30°, 23°, 17° and 10° respectively. The reflectance at point $X_1$ for both surfaces 48a and 48b is 34%, 20% and ~6% at the incident angles 23°, 17° and 10° respectively. The reflectance at point $X_2$ for both surfaces 48b and 48c is 36% and 20% at the incident angles 17° and 10° respectively, and the reflectance at point $X_3$ is 38% at incident angle 10°. Evidently, the overall efficiency is 30%±4% over the entire FOV while the transmission of the LOE is 65%±5% as required. Naturally, the reflectance curve of the coating can be changed either gradually or continuously as a function of the lateral axis in this case as well.

Figure 11:
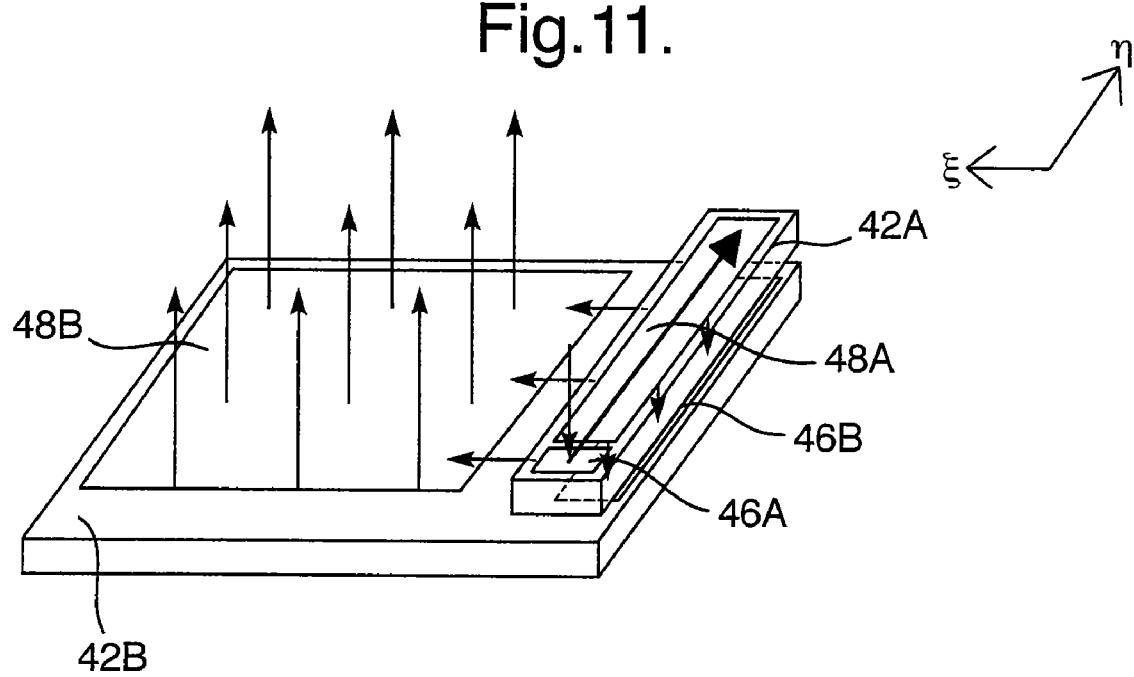

Thus far, only the FOV along the $\xi$ axis has been discussed. The FOV along the orthogonal $\eta$ axis should also be considered. The FOV along the $\eta$ axis is not dependent upon the size or the number of selectively reflecting surfaces, but rather, on the lateral dimension along the $\eta$ axis of the input waves coupled into the substrate. FIG. 11 illustrates an alternative method to expand the beam along both axes utilizing a double LOE configuration. The input wave is coupled into the first LOE 42A by the first reflecting surface 46A and then propagates along the $\eta$ axis. The partially reflecting surfaces 48A couple the light out of 42A and the light is subsequently coupled into the second LOE 42B by the reflecting surface 46B. The light then propagates along the $\xi$ axis, and is then coupled out by the selectively reflecting surfaces 48B. As shown, the original beam is expanded along both axes where the overall expansion is determined by the ratio between the lateral dimensions of the elements 46A and 48B. The configuration given in FIG. 11 is just an example of a double-LOE setup. Other configurations, where two or more LOEs are combined together to form complicated optical systems, are also possible. However, in all of the possible configurations, the reflectance of the reflecting surfaces 48A are designed by methods similar to those described above in relation to FIGS. 9 to 10. That is, for each particular angle along the $\eta$ axis, a ray is plotted from the center of the designated eye pupil 50 to the partially reflecting surfaces 46B, taking into account not only the refraction due to Snell's Law, but also the propagation of the waves along the second LOE 42A, and the reflection from the reflecting surfaces 48A to the reflecting surface 46B. The calculated direction is set as the nominal incident direction and the particular coating is designed according to that direction, taking into account prior reflectance related to this particular viewing angle. Here also, the coating at each section of the reflecting surface is set to minimize the influence of the section on the rays that should not be reflected out of it. It is therefore possible to optimize the coupled-out illumination from the double-LOE configuration over the entire area of exit pupil of the system.

Since the output illumination from the exit aperture of the LOW is not uniform anymore, Eq. (8) is modified to $$B_I = R*B_D*S_{in}/S_{out}*S_{out}/S_{eye}/\beta = R*W_S*\gamma/(\alpha_H*S_{eye}*\beta), \quad (9)$$

or $$W_S = B_H*\alpha_H*S_{eye}*\beta/(R*\gamma), \quad (10)$$

wherein $S_{eye}$ is the area of the exit pupil of the system and $\beta$ is defined as the "optimization ratio" of the output brightness of the LOE design, which is derived from the nonuniformity of the output illumination over the entire exit area of the LOE. Usually, $\beta$ has values in the range $$S_{out}/S_{eye} > \beta > 1. \quad (11)$$

That is, for systems with no optimization, wherein the output brightness is uniform over the entire exit output of the LOE, the optimization ratio is $\beta = S_{out}/S_{eye}$ and Eq. (9) is degenerated back into Eq. (8). For the best optimized system, wherein the entire coupled out energy from the LOE is diverted into the exit pupil of the optical system, the optimization ratio is $\beta = 1$. Inserting this value into Eq. (9) yields $$B_I = R*W_S*\gamma/(\alpha_H*S_{eye}). \quad (12)$$

In order to optimize the brightness at the exit pupil of the system it is desired to minimize $\beta$. Usually, in see-through systems, wherein R<0.4, it is possible to obtain, with proper design, $\beta$ in the range $$2 > \beta > 1.5. \quad (13)$$

For an opaque system, where R~1, it is possible to obtain, with proper design, $\beta$ in the range $$4 > \beta > 3. \quad (14)$$

The above-described method is for an LOE-based HMD having the following parameters:

$$B_A = 10,000 FL; \alpha_H = 16°*12° = 0.06 SteRad; \gamma = 0.05$$

$$S_{eye} = 10mm*10mm = 0.0011 ft^2$$

$$S_{out} = 24mm*28mm = 0.0069 ft^2; R = 0.35; \beta = 2, \quad (15)$$

wherein $B_A$ is the maximal brightness of the ambient light and the required contrast ratio of the display system is 1.2. In addition, a semi-transparent filter with a transparency of 0.15 is located in front of the combiner. Therefore, an output brightness of 300 FL is sufficient for the maximal output brightness. Inserting Eq. (14) into Eq. (10) yields $$W_S = 2.3 Lumen. \quad (16)$$

Assuming a white light illuminated display source, the conversion ratio of light having a photopic curve from Lumens to Watts is $$1 watt \sim 250 lumen \quad (17)$$

Inserting Eq. (17) into Eq. (16) yields $$W_S = 9.2 mW \quad (18)$$

Assuming that the photonic efficiency of the light source is $\eta = 0.07$ yields $$P_S = W_S/\eta = 133 mW. \quad (19)$$

A white-light LED was utilized as the backlight for the LCD. Due to the large spreading angle of the LED only about one third of its energy was actually exploited. A driving current of 160 mA (or power consumption of 530 mW) was required to operate the LED with the necessary output power of 7.5 Lumen, and an actual output brightness of 280±20 FL was measured at the output of the HMD system.

In comparison, for a conventional optical HMD system, $S_{in}=S_{out}$, and the reflectance is uniform over the entire area of the combiner. Comparing Eqs. (9) and (9) yields $$B_H = B_L * S_{eye}/S_{in} * \beta. \tag{20}$$

That is, for a given light source, an LOE based HMD can achieve brightness larger than a conventional optics based HMD by a factor of $S_{in}/(S_{eye}*\beta)$. Inserting the parameters of Eq. (15) into Eq. (20) yields $$B_L = B_H * 3.2. \tag{21}$$

The overall photon efficiency of a system can thus be improved three-fold for an LOE-based HMD as compared to a system having a conventional combiner. Alternatively, a light source with a power consumption of 1600 mW is required for a conventional HMD having the above parameters.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device, comprising:
   a display source;
   an imaging optical module; and
   a projection mechanism, including a light-transmitting substrate, an input aperture and an output aperture defined by non-overlapping surface areas on the substrate and an exit pupil spaced apart from the output aperture, light from the imaging optical module being projected to the exit pupil, the light-transmitting substrate having at least two major parallel surfaces, optical means for coupling light emerging from the display source into the substrate by total internal reflection, and at least first, second and third partially reflecting surfaces located in the substrate for coupling the light out of the substrate, wherein the orientations between the partially reflecting surfaces and the exit pupil define first, second and third incident angles at the partially reflecting surfaces, the partially reflecting surfaces being coated with three different coatings so that at the third incident angle, the reflectance from the third surface is higher than the reflectance from the second surface, at the second and the third incident angles, the reflectance from the second surface is higher than the reflectance from the first surface, and the reflectance from the second partially reflecting surface at the second incident angle, is higher than the reflectance at the third incident angle.

2. The optical device according to claim 1, wherein the input aperture of the projection module is contained in the optical means.

3. The optical device according to claim 1, wherein the output aperture of the projection module is contained in at least one reflecting surface.

4. The optical device according to claim 1, wherein the projection mechanism is the reflectance of the reflecting surfaces.

5. The optical device according to claim 1, wherein the reflectance of the reflecting surfaces are selected to control brightness across the field of view.

6. The optical device according to claim 1, wherein the reflectance of the reflecting surfaces are selected to reflect light emerging from the display source into a direction selected to reach the exit pupil of the optical device.

7. The optical device according to claim 1, wherein the reflectance of the reflecting surfaces are is selected to reflect light emerging from the display source into a direction selected to reach one eye of an observer.

8. The optical device according to claim 1, wherein the reflectance of the reflecting surfaces are selected to reflect light emerging from the display source into a direction selected to reach both eyes of an observer.

9. The optical device according to claim 1, wherein the partially reflecting surfaces are parallel to each other and are non-parallel to any of the edges of the major surfaces of the substrate.

10. The optical device according to claim 1, wherein the reflectance of at least one of the partially reflecting surfaces is non-uniform across the reflecting surface.

11. The optical device according to claim 1, wherein the distances between the partially reflecting surfaces are selected to control the brightness across the field of view.

12. The optical device according to claim 1, wherein the reflectance from the second partially reflecting surface at the second incident angle is higher than the reflectance from the first partially reflecting surface at the first incident angle.

13. The optical device according to claim 1 wherein the reflectance from the third partially reflecting surface at the third incident angle is higher than the reflectance from the second partially reflecting surface at the second incident angle.

14. The optical device according to claim 1 wherein the reflectance from the first partially reflecting surface at the first incident angle is higher than the reflectance at the second incident angle.

15. The optical device according to claim 1 wherein the reflectance from the first partially reflecting surface at the second incident angle is higher than the reflectance at the third incident angle.

16. The optical device according to claim 1 wherein the brightness of light waves reflected from the first and second surfaces to the exit pupil are approximately the same.

17. The optical device according to claim 1 wherein the brightness of light waves reflected from the second and the third surfaces to the exit pupil are approximately the same.

* * * * *